(12) United States Patent
Carter (10) Patent No.: US 6,616,312 B2
(45) Date of Patent: Sep. 9, 2003

(54) CONVENIENCE LIGHTING FOR INTERIOR AND EXTERIOR VEHICLE APPLICATIONS

(75) Inventor: John W. Carter, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/989,045

(22) Filed: Nov. 20, 2001

(65) Prior Publication Data

US 2003/0095415 A1 May 22, 2003

(51) Int. Cl.[7] .................................................. B60Q 1/00
(52) U.S. Cl. ...................... 362/488; 362/227; 362/232; 362/494; 49/502
(58) Field of Search ................ 362/488, 494, 362/232, 227; 49/502

(56) References Cited

U.S. PATENT DOCUMENTS

| | | | |
|---|---|---|---|
| 1,096,452 A | | 5/1914 | Perrin |
| 1,523,495 A | | 1/1925 | Silberman |
| 1,629,456 A | | 5/1927 | Pellegrini |
| 1,721,347 A | | 7/1929 | Macrae et al. |
| 1,795,164 A | | 3/1931 | Crookshanks et al. |
| 2,010,374 A | * | 8/1935 | Pissis ........................... 362/49 |
| 2,760,050 A | | 8/1956 | Porsche |
| 2,904,671 A | | 9/1959 | Johnston |
| 3,280,321 A | | 10/1966 | Overesch |
| 3,388,244 A | | 6/1968 | Castoe |
| 3,478,199 A | | 11/1969 | Brock |
| 3,982,119 A | * | 9/1976 | Aluzzo et al. ................ 362/23 |
| 4,509,293 A | * | 4/1985 | Ufrecht et al. ................ 49/502 |
| 4,788,630 A | | 11/1988 | Gavagan |
| 4,890,907 A | | 1/1990 | Vu et al. |
| 5,017,903 A | | 5/1991 | Krippelz, Sr. |
| 5,025,352 A | | 6/1991 | Brown |
| 5,297,010 A | | 3/1994 | Camarota et al. |
| 5,371,659 A | | 12/1994 | Pastrick et al. |
| 5,497,306 A | | 3/1996 | Pastrick |
| 5,669,704 A | | 9/1997 | Pastrick |
| 5,709,453 A | | 1/1998 | Krent et al. |
| 5,803,579 A | | 9/1998 | Turnbull et al. |
| 5,823,654 A | | 10/1998 | Pastrick et al. |
| 5,879,074 A | | 3/1999 | Pastrick |
| 6,074,077 A | | 6/2000 | Pastrick et al. |
| 6,118,372 A | | 9/2000 | Leow |
| 6,149,287 A | | 11/2000 | Pastrick et al. |
| 6,152,590 A | | 11/2000 | Furst et al. |
| 6,164,805 A | | 12/2000 | Hulse |

\* cited by examiner

*Primary Examiner*—Sandra O'Shea
*Assistant Examiner*—James W Cranson
(74) *Attorney, Agent, or Firm*—Brian J. Rees; Price, Heneveld, Cooper, Dewitt & Litton (57) ABSTRACT

A lighting apparatus for a vehicle includes a light source attached inside the vehicle, such as to an "A" pillar adjacent a front of a side window of the vehicle, where the light source is oriented to direct light toward a ground area adjacent the vehicle for security and convenience. Variations include also reflecting a portion of the light from the light source off an outside rearview mirror onto the ground area, and also directing a portion of the light toward an area inside the vehicle.

29 Claims, 7 Drawing Sheets

CONVENIENCE LIGHTING FOR INTERIOR AND EXTERIOR VEHICLE APPLICATIONS

BACKGROUND

The present invention relates to interior and exterior vehicle convenience and security lighting, and more particularly relates to a lighting arrangement optimized to provide good lighting around the sides of a vehicle for security and also for convenience while positioning the lighting in a place that minimizes cost and maximizes convenience and long term life.

It is known to provide an outside rearview mirror with a light source therein for illuminating an area adjacent a vehicle. (For example, see U.S. Pat. No. 6,149,287.) However, outside rearview mirrors are preferably limited in size, such that there is limited room within a mirror housing for any light source or lens. Further, outside rearview mirrors are subject to harsh outside environments and abuse, such that any light source will need to be sufficiently durable to withstand the environment and abuse, adding to its cost. In particular, it is noted that mirrors tend to vibrate and receive road dust and debris, which vibration, dust and debris tends to reduce the life of a light source. Still further, it is undesirable to add components to outside rearview mirrors where it adds significantly to their total cost, since outside rearview mirrors often need to be replaced since they extend laterally from a vehicle and tend to be damaged more often than other vehicle components.

Thus, a lighting apparatus is desired solving the aforementioned problems and having the aforementioned advantages, and in particular, a lighting apparatus is desired that is lower cost and more durable and longer lasting than an outside-mirror-mounted light.

SUMMARY OF THE PRESENT INVENTION

In one aspect of the present invention, a security apparatus for a vehicle includes a first vehicle component including transparent material that, when in a vehicle-mounted position, defines an inside and an outside of a vehicle passenger compartment. A second vehicle component located proximate the first vehicle component and located on the inside, and a light source attached to the second vehicle component and oriented to direct light through the transparent material downwardly toward an area adjacent and beside the vehicle.

In a narrower aspect, the transparent material is a window and includes a lens for focusing the light.

In another narrower aspect, the transparent material comprises a side window of the vehicle, and the second vehicle component comprises an "A" pillar of the vehicle.

In yet another narrower aspect, an outside rearview mirror is provided, and at least a portion of the light is directed toward and reflects from the outside rearview mirror.

In yet another aspect, the light source directs light inside the vehicle as well as outside the vehicle.

In another aspect of the present invention, a vehicle is provided having a side window defining part of a passenger compartment, and a structural component located proximate the side window and inside the passenger compartment. An improvement in lighting includes a light source attached to the structural component and oriented to direct light through the side window for illuminating an area adjacent the vehicle.

In still another aspect of the present invention, an apparatus for a vehicle includes an outside rearview mirror

2 including a reflective element, and a light source oriented to and directing light against the reflective element at an angle so that light reflected from the reflective element goes downwardly and toward a ground area adjacent the vehicle.

In still another aspect of the present invention, an apparatus for a vehicle includes a vehicle having a rearview mirror, a side window, an "A" pillar, a "B" pillar and a roof component, and a light source attached to one of the "A" pillar, the "B" pillar and the roof component and that is oriented to direct light toward one or both of the rearview mirror and a ground area adjacent the vehicle.

In yet another aspect of the present invention, a security and convenience lighting apparatus for a vehicle includes a component defining an inside and an outside of a vehicle, and a light source that directs a first portion of light toward the inside and a second portion of light toward the outside.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 4:
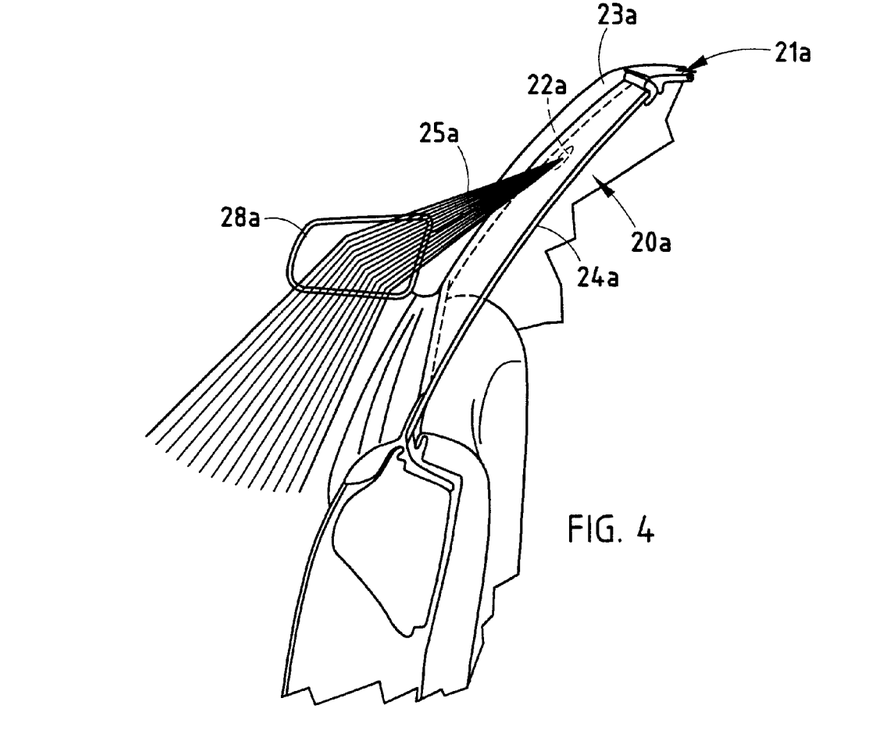
FIGS. 4–5 are front and side fragmentary views of a first modified lighting arrangement, including an "A"-pillar-mounted light focusing a column of light toward an outside rearview mirror.
Figure 5:
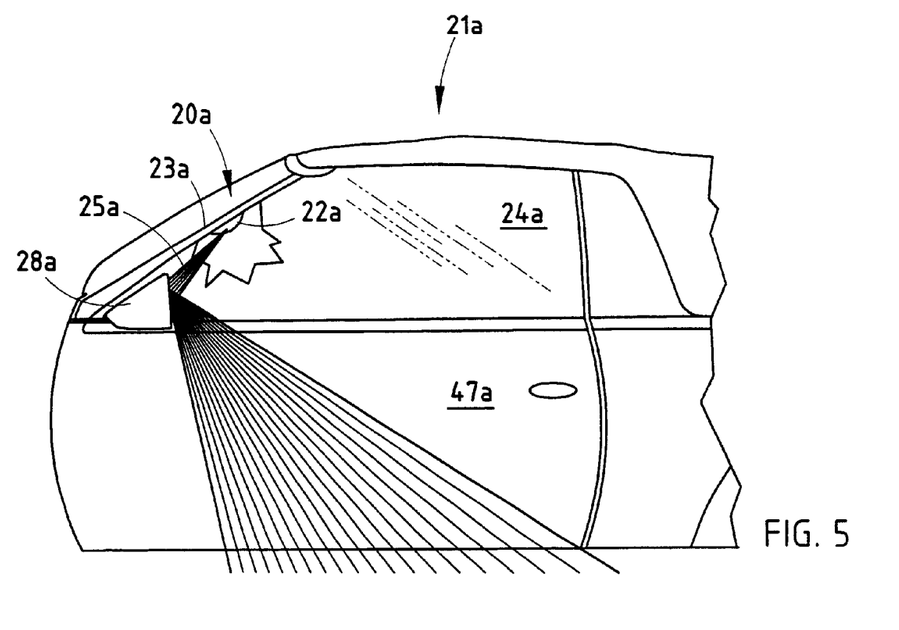
Figure 6:
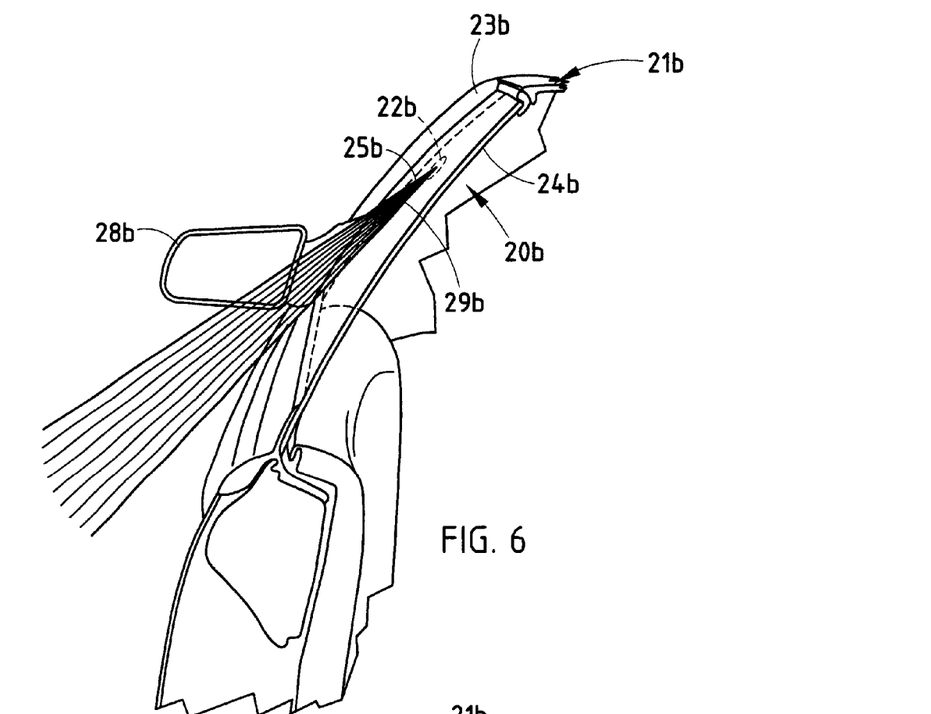
FIGS. 6–7 are front and side fragmentary views of a second modified lighting arrangement, including an "A"-pillar-mounted light focusing a column of light through a lens on a vehicle side window.
Figure 7:
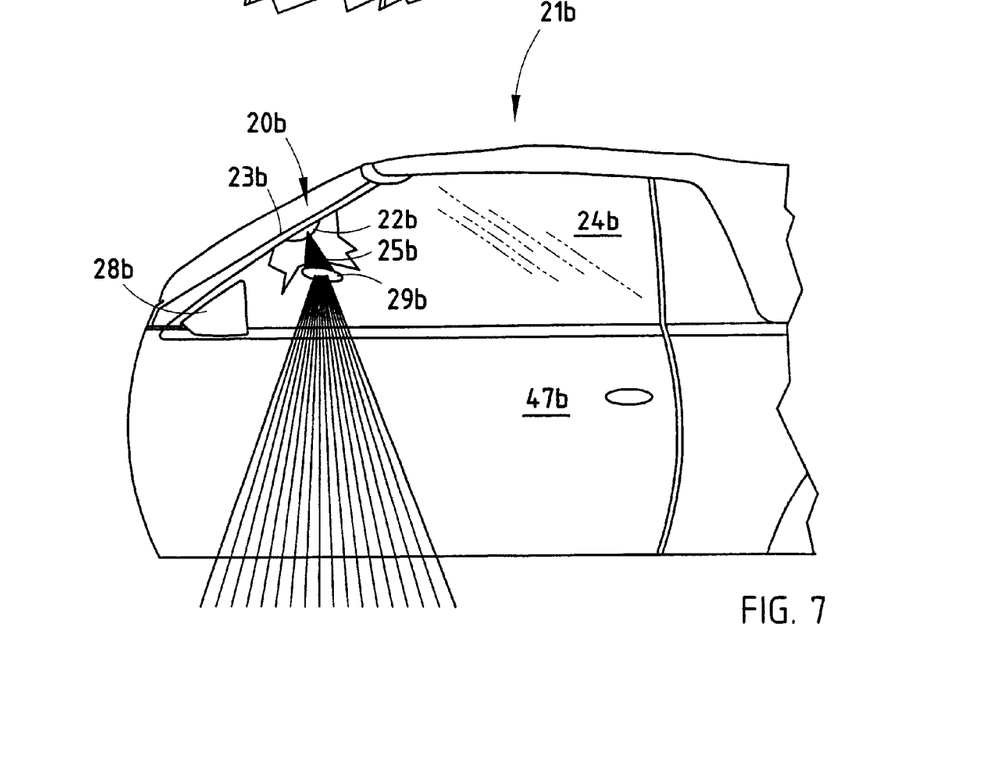
Figure 8:
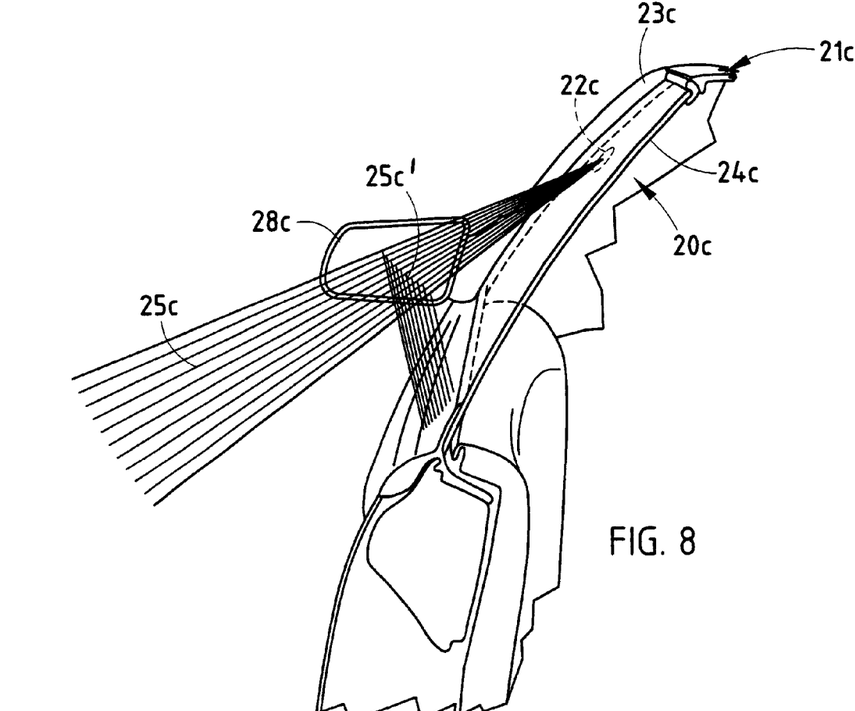
FIGS. 8–9 are front and side fragmentary views of a third modified lighting arrangement, including an "A"-pillar-mounted light focusing light through a side window, part of the column reflecting from the outside rearview mirror.
Figure 9:
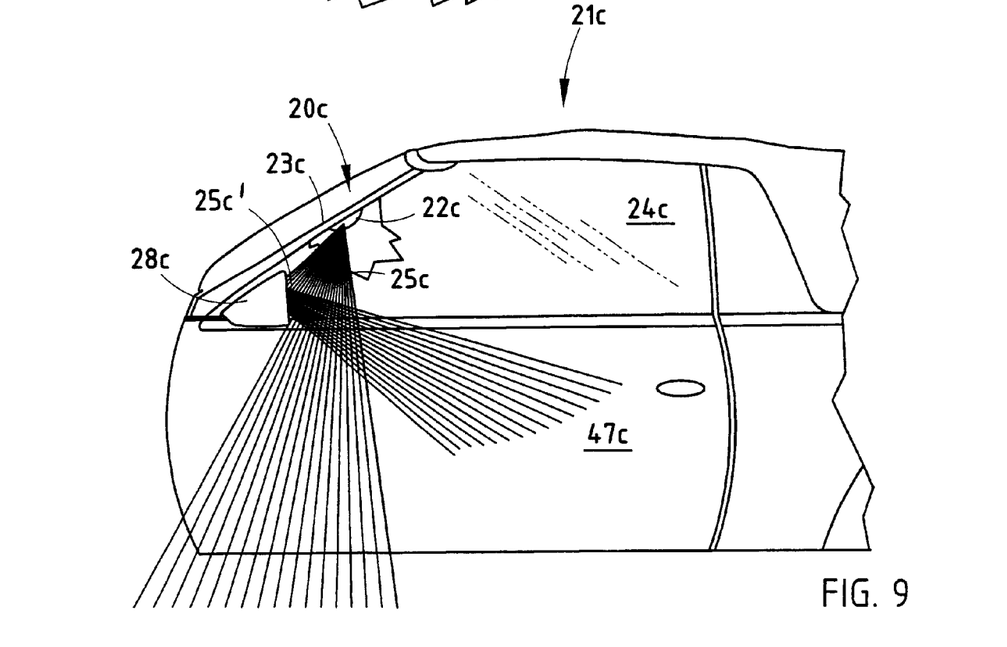
Figure 10:
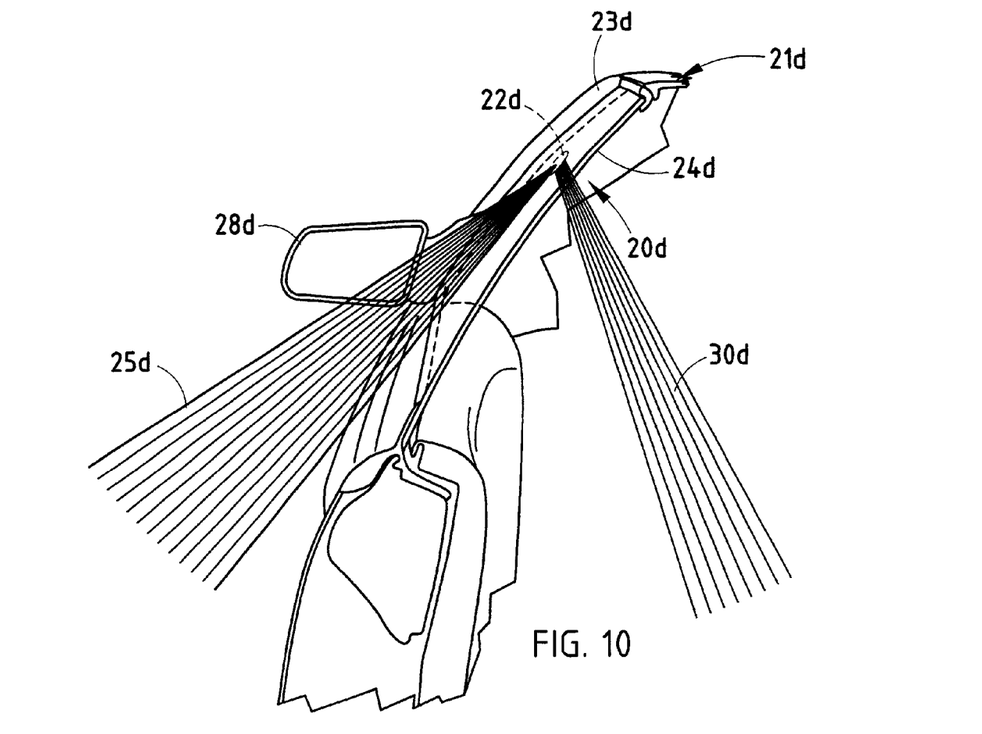
FIGS. 10–11 are front and side fragmentary views of a fourth modified lighting arrangement, including an "A"-pillar-mounted light focusing light both inside and outside the vehicle.
Figure 11:
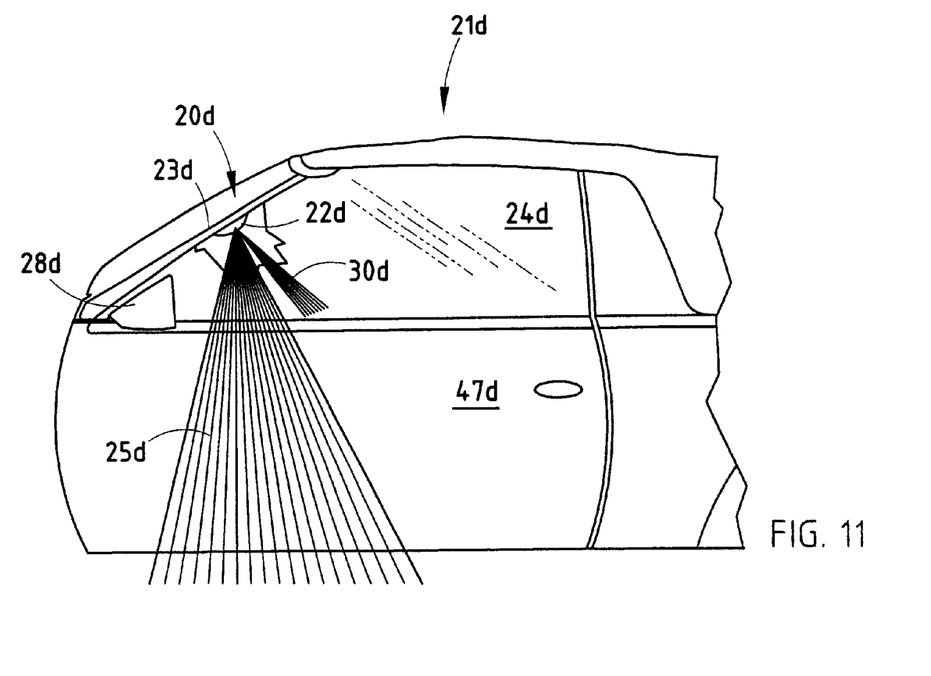

A lighting and security apparatus 20 (FIGS. 1–3) for providing security and convenience lighting around a vehicle 21 includes a light source 22 attached to the inside of a passenger compartment of the vehicle 21, such as to an "A" pillar 23 adjacent a front of a side window 24 of the vehicle 21. The light source 22 is oriented to direct light 25 through the side window 24 toward a ground area 26 adjacent the vehicle 21, thus providing light for passenger security and convenience. Since the light source 22 is within the vehicle, it is well-protected against harsh outside environments, and further, assembly of the light source 22 to the vehicle is simplified. Variations include orienting the light source 22A (FIGS. 4–5) to cause a portion 25A of the light to reflect off an outside rearview mirror 28A of the vehicle 21A onto a ground area, and/or directing a portion 25B of light (FIGS. 6–7) through a lens 29B on the window 24B, and/or providing an arrangement doing a combination of the above (FIGS. 8–9), and/or also directing a portion 30D (FIGS. 10–11) of the light toward an area inside the vehicle 21D.

The passenger vehicle 21 (FIG. 1) includes a vehicle body 40, and left and right front doors 41. The body 40 defines front openings for the front doors 41, including a roof 43, "A" pillars 23, and "C" pillars 46. In a four-door vehicle, the front door openings are defined by the "A" pillar, a "B" pillar, and the roof 43, and the rear door openings are defined by the "B" pillar, the "C" pillar, and the roof 43. The illustrated front door 41 includes a lower hollow portion 47, and does not include an inverted U-shaped top perimeter frame that extends up and over the lower portion to form a window opening in each respective door. However, it is contemplated that the present invention can be used with a door having a U-shaped top frame 42 over its window glass, such as is illustrated in FIG. 1C. The illustrated window 24 comprises a transparent glass window element that can be raised to cover and close the window opening formed by the door, or lowered into the lower hollow portion 47 to open the window opening.

The illustrated light source 22 is designed to project or direct a columnar beam of light through the window glass in a specific direction for illuminating a desired area. It is known to provide convenience light sources on a vehicle. Accordingly, it is not necessary to describe the present light source 22 in substantial detail in order for a person of ordinary skill in the art to understand the present invention. Nonetheless, it is noted that the preferred embodiment includes a durable, battery-operated light source having an internal bulb or light-generating element, a housing having a reflective back portion and a lens-covered front, with the housing being snap-attachable or otherwise securely attachable to the "A" pillar 23.

Figure 1:
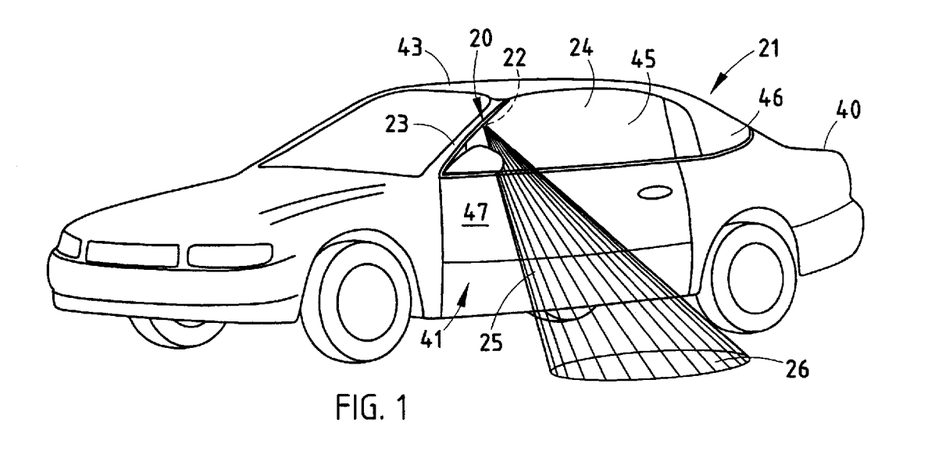
FIG. 1 is a perspective view of a vehicle with an "A"-pillar-mounted light that casts light inside and outside the vehicle.
Figure 1A:
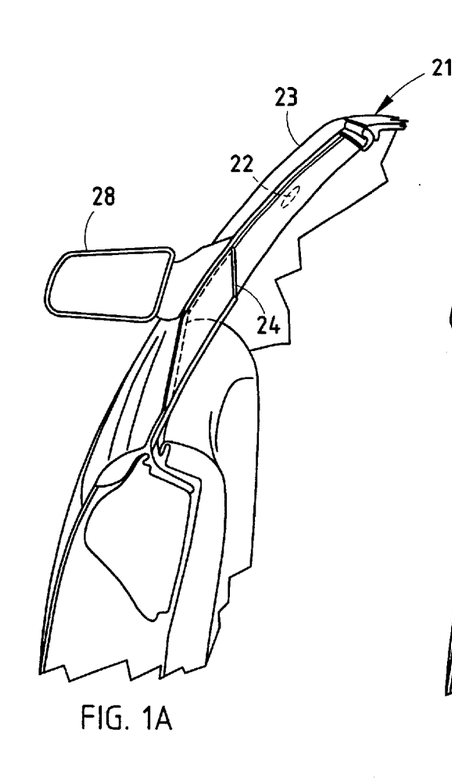
FIG. 1A is an elevational view taken from a rear of a driver-side door and looking toward its outside rearview mirror and "A" pillar, the window being halfway open, the door having a top perimeter frame extending around the window.
Figure 1B:
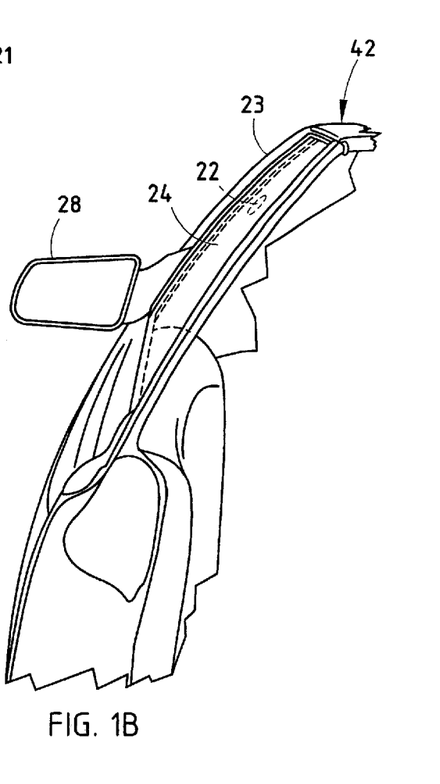
FIG. 1B is a view similar to FIG. 1A, but the door including a top perimeter frame.
Figure 1C:
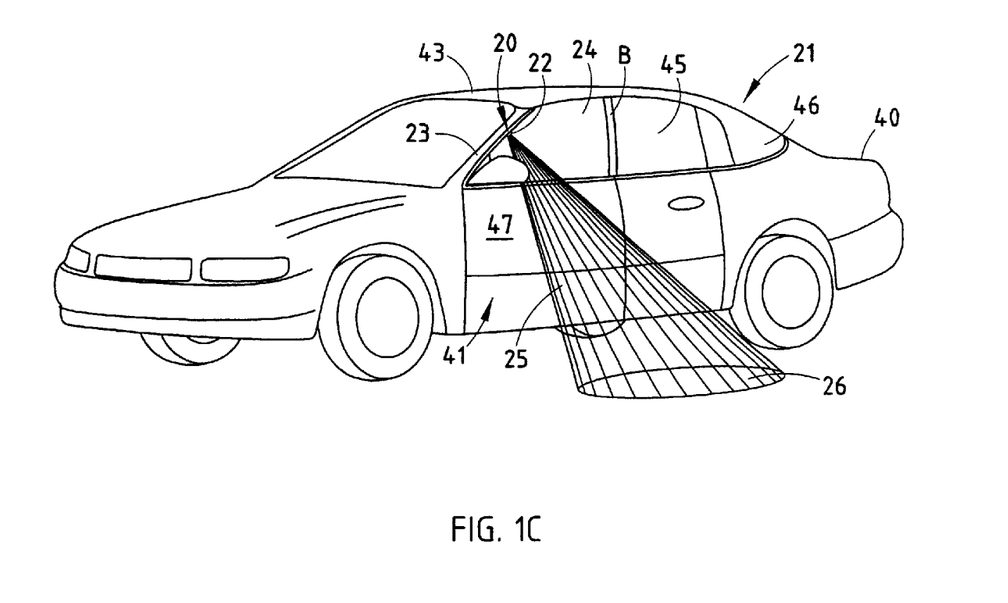
FIG. 1C is a view similar to FIG. 1, but showing a vehicle with "A", "B", and "C" pillars.
Figure 2:
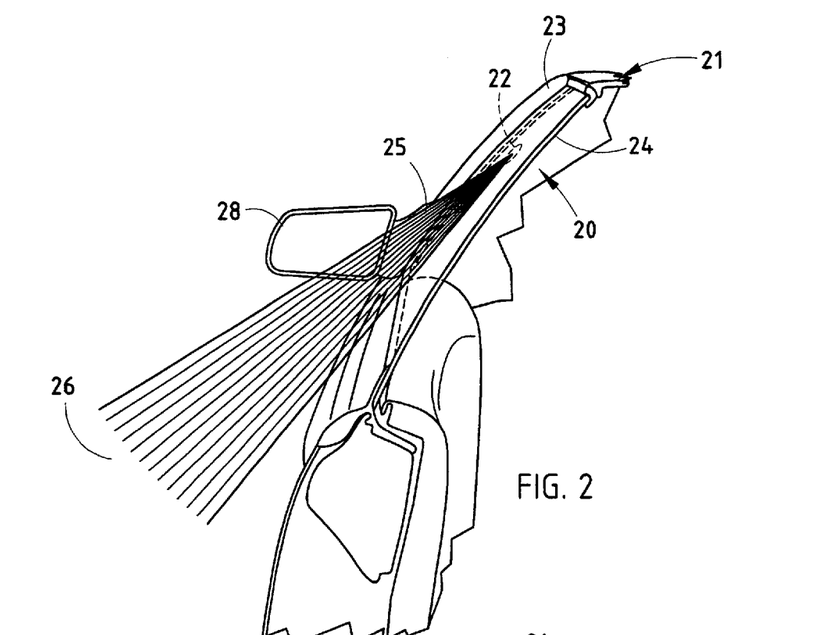
FIGS. 2–3 are front and side fragmentary views of the lighting arrangement shown in FIG. 1, including an "A"-pillar-mounted light focusing a column of light through a side window.
Figure 3:
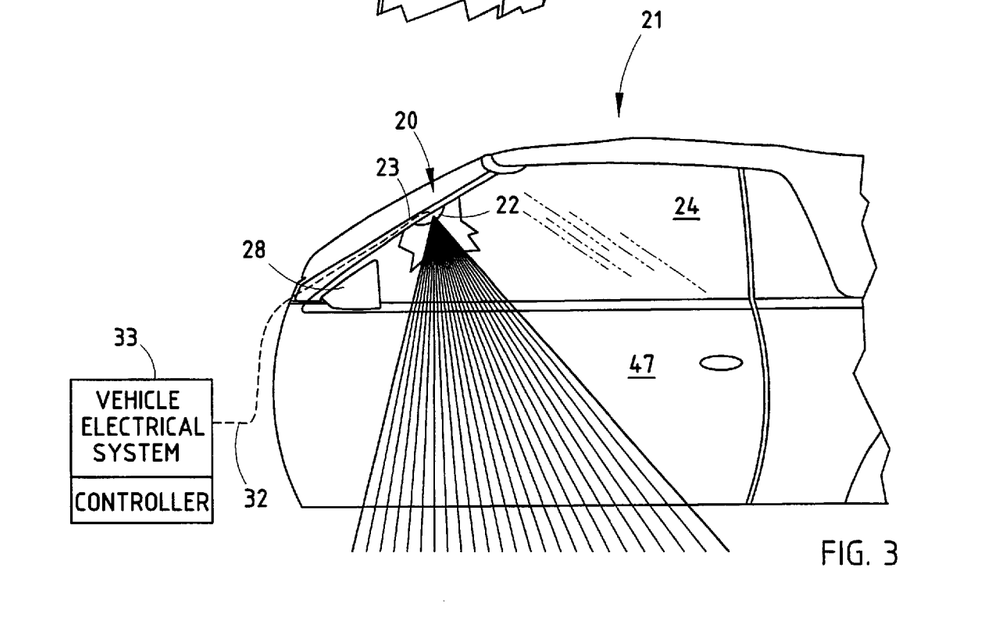

It is noted that the location of the light source 22 in FIGS. 1–3 is illustrated to be in the left hand "A" pillar (i.e. on the vehicle driver side) about mid-way down the "A" pillar, with wiring 32 extending longitudinally within and along the "A" pillar and connecting to the vehicle electrical system 33. The vehicle electrical system 33 includes a controller or processor for controlling operation of the convenience and security lighting in an optimal manner as designed by the automotive engineers. For example, by operation of the controller, the light source 22 can be made to come on when the vehicle's keyless entry system is activated, when the vehicle's convenience light system is activated, when the vehicle's emergency four-way flashing system is activated, and/or only when it is dark outside.

It is contemplated to be within a scope of the present invention to place the light source 22 at other locations, e.g. along an edge of a headliner in the vehicle (i.e. which headliner covers a top of the passenger compartment) or in the "B" pillar (which is located immediately rearward of the illustrated driver side window 24). It is also contemplated that the light source 22 can be positioned in the "C" pillar or quarter panel for directing light adjacent the rear side door of a vehicle for the convenience and safety of rear passengers. Alternatively, the light source 22 could be located in the door frame itself (e.g. in a slider door of a minivan above the side door window glass). It is noted that the light source can also be located on the left or right side of the vehicle, and could be combined with lights in the inside or outside mirrors and other convenience lights to create a combined package of illumination and security for the vehicle.

It has been found that the present lighting arrangement provides sufficient light for illuminating the ground area 26, even though a small amount of light reflects back into the vehicle. Several factors influence the percentage of the light that reflects off the window glass and stays within the vehicle passenger compartment, such as the angle of incidence of the light with respect to the window, the surface of the glass, the intensity of the light, and other factors. Nonetheless, much of the reflected light that stays within the vehicle passes downwardly beside the vehicle driver to a location where it is not problematic. Further, a high percentage of the light does pass through the window glass, such that the present arrangement is considered to be highly effective. It is noted that the lens 29B (FIG. 7) can be made to reduce undesired reflection of light back into the vehicle.

It is noted that the present invention is retrofittable and can be installed on existing vehicles, and further can be installed on new vehicles without major modification of existing vehicle designs. In particular, it is noted that wiring already is passed longitudinally through the "A" pillar in many, if not most, modern vehicles.

The illustrated light source 22 includes a lens and light-generating arrangement that focuses a column of light into the desired area 26 (FIG. 1). This area can be varied by design. For example, the illuminated ground area can be about 2' to 4' diameter in size, and can be round or oblong in shape. Optimally, a rear of the lighted area 26 is near or rearward of the door lock for the door having the window 24, and a front of the lighted area 26 extends to a location about under the front rearview mirror. However, the specific area and density of light can be varied by design. For example, in some vehicle designs, it is contemplated that the light area will be intended only to facilitate a person's view of keys when trying to unlock the vehicle.

The apparatus of vehicles 21A (FIGS. 4–5), 21B (FIGS. 6–7), 21C (FIGS. 8–9), and 21D (FIGS. 10–11) are similar to the vehicle 21. Similar and identical components are labeled with identical numbers, but with the addition of the letters "A", "B", "C", or "D". This is done to reduce redundant discussion, and not for another purpose.

The lighting and security apparatus 20A (FIGS. 4–5) includes a light source 22A that directs a majority of its light toward the outside rearview mirror 28A. The light 25A strikes the reflective surface of the mirror 28A and reflects downwardly and rearwardly toward the area under the outside door lock. Notably, where the rearview mirror has a concave or convex reflective surface (as is sometimes done on a passenger side of vehicles), the column of light from the light source 22A may need to be adjusted by a lens on the light source 22A to an optimal size so that after reflection it will be an appropriate size for its final distribution/pattern on the ground area.

The lighting and security apparatus 20B (FIGS. 7–8) includes a lens 29B on the window 24B. The illustrated lens 29B is relatively small and is located high enough on window 24B so that it does not interfere with the normal vision of a vehicle driver out of the left-hand window 24B. The illustrated lens 29B is a stick-on lens with an adhesive that does not unacceptably distort or absorb light passing through it, although it is contemplated that the lens could be designed as an integral part of the window 24B. The lens 29B is relatively long in a horizontal direction, and narrower in a vertical direction, but of course the lens could be any shape desired for optimal function, aesthetics, and operation. It is contemplated that thin stick-on lens are known in the industry, and therefore such lens do not need a detailed disclosure for a person skilled in the art to understand and practice the present invention without undue experimentation. An advantage of a thin stick-on lens is that it would slip with a window past the weather seal and down into a window opening in a door.

The lighting and security apparatus 20C (FIGS. 9–10) is a combination of the light source 22 and the light source 22A. Specifically, the light source 22C directs a first portion of light 25C directly to the ground area, and directs a second portion of light 25C toward the mirror 28C such that reflected light illuminates a different part of the ground area. It is also contemplated that a lens 29B could be incorporated into the structure of apparatus 20C, and that the interior lighting feature of apparatus 20D could also be incorporated into the present apparatus 20C.

The lighting and security apparatus 20D (FIGS. 11–12) includes a light source 22D that directs a first portion of light 25D toward an outside of the vehicle for illuminating a ground area, and directs a second portion of light 30D toward an inside of the vehicle for illuminating an interior area. For example, this allows a person entering the vehicle to see if a person is hiding inside the vehicle. It also reduces the number of light sources required on the vehicle, since a single light source is used to illuminate both inside and outside the vehicle. By placing the light source 25D on the "A" pillar 23D, the light 25D is easier for a vehicle passenger to reach than if the light source 25D were placed in other locations, such as on an interior rearview mirror or on an overhead console. It is contemplated that the light source 25D can include a switch for manual activation. This would allow the light source 25D to be used as a map light. It is also contemplated that one or two light bulbs could be used in the light source 25D, and that the switch could be used to activate one or both of the light bulbs for manual activation. Also, the light source 25D could include light bulbs having different light intensities, so that the vehicle electrical system could activate and provide different levels of light in response to different vehicle conditions. Notably, different light intensities can also be generated by the controller providing different levels of voltage and current to a single light bulb based on different vehicle conditions. It is also contemplated that a light pipe could be used to communicate light from another source, such as a headlight, to a side of the vehicle, such that a side of the vehicle would be lighted by activation of a keyless entry system where the keyless entry system flashed the vehicle front headlights.

The inventive light assembly 22D (and/or 22, 22A, 22B, 22C) may be constructed using any form of light source. LEDs are particularly advantageous due to their longer life and smaller size. If utilized, the LEDs are preferably constructed with heat extraction members in accordance with the teachings of commonly assigned U.S. patent application Ser. No. 09/426,795, entitled "SEMICONDUCTOR RADIATION EMITTER PACKAGE," and filed on Oct. 22, 1999, the entire disclosure of which is incorporated herein by reference. Such LEDs may have their heat extraction members coupled to a heat sink in a manner similar to that disclosed in commonly assigned U.S. patent application Ser. No. 09/425,792, entitled "INDICATORS AND ILLUMINATORS USING A SEMICONDUCTOR RADIATION EMITTER PACKAGE," and filed on Oct. 22, 1999, the entire disclosure of which is incorporated herein by reference. These LEDs each also preferably include at least two LED chips including a chip that emits amber light and a chip that emits blue-green light such that the light emitted by these differently colored chips is simultaneously emitted from the LED and mixes to form effective white light. Methods and implementations for forming effective white light by mixing the light from two or more LEDs are disclosed in commonly assigned U.S. Pat. No. 5,803,579, the entire disclosure of which is incorporated herein by reference. The LEDs also preferably include a lens integrally formed within the LED encapsulant. Preferably, the lens provided on each LED is a microgroove or Fresnel lens as disclosed in commonly assigned U.S. Provisional Patent Application No. 60/270,054, entitled "RADIATION EMITTER DEVICE HAVING A MICRO-GROOVE LENS," and filed on Feb. 19, 2001, the entire disclosure of which is incorporated herein by reference.

It is to be understood that variations and modifications can be made on the aforementioned structure without departing from the concepts of the present invention, and further, it is to be understood that such concepts are intended to be covered by the following claims unless these claims by their language expressly state otherwise.

I claim:

1. A security apparatus for a vehicle comprising:
  a first vehicle component including transparent material that, when in a vehicle-mounted position, defines an inside and an outside of a vehicle passenger compartment;
  a second vehicle component located proximate the first vehicle component and located on the inside; and
  a light source attached to the second vehicle component and oriented to direct light through the transparent material downwardly toward an area adjacent and beside the vehicle; and
  an outside rearview mirror, and wherein the light source directs the light toward a reflector of the rearview mirror so that the light is reflected rearwardly and downwardly from the rearview mirror.

2. The security apparatus defined in claim 1, wherein the first vehicle component includes a window covered by the transparent material.

3. The security apparatus defined in claim 2, wherein the first vehicle component comprises a front door having the window therein, and the second vehicle component includes an "A" pillar.

4. The security apparatus defined in claim 3, including a lens attached to the transparent material that is configured to focus the light passing through the transparent material.

5. The security apparatus defined in claim 1, wherein the first vehicle component includes a door frame for a vehicle, and wherein the transparent material is attached to the door frame.

6. The security apparatus defined in claim 1, wherein the first vehicle component includes a lens positioned on the transparent material.

7. The security apparatus defined in claim 1, including a lens attached to the transparent material that is configured to focus the light passing through the transparent material.

8. In a vehicle having a side window defining part of a passenger compartment, and a structural component located proximate the side window and inside the passenger compartment, an improvement in lighting comprising:
  a light source attached to the structural component and oriented to direct light through the side window for illuminating an area adjacent the vehicle; and an outside rearview mirror, and wherein the light source directs the light toward a reflector of the rearview mirror so that the light is reflected rearwardly and downwardly from the rearview mirror.

9. The security apparatus defined in claim 8, including a front door having the window therein.

10. The security apparatus defined in claim 8, including a lens attached to the window that is configured to focus the light passing through transparent material of the window.

11. An apparatus for a vehicle comprising:

an outside rearview mirror including a reflective element;

a light source oriented to and directing light against the reflective element at an angle so that light reflected from the reflective element goes downwardly and toward a ground area adjacent the vehicle.

12. The security apparatus defined in claim 11, including a first vehicle component supporting the rearview mirror, and a second vehicle component supporting a window, and wherein the light source directs light through the window toward the rearview mirror.

13. The security apparatus defined in claim 12, including a lens attached to the window that is configured to focus the light passing through the window toward the rearview mirror.

14. An apparatus for a vehicle comprising:

a vehicle including a rearview mirror, a side window, a "A" pillar, a "B" pillar and a roof component; and a light source attached to one of the "A" pillar, the "B" pillar and the roof component and that is oriented to direct light toward one or both of the rearview mirror and a ground area adjacent the vehicle.

15. A security and convenience lighting apparatus for a vehicle comprising:

a component defining an inside and an outside of a vehicle; and a light source that directs a first portion of focused light toward the inside and a second portion of the focused light toward the outside, the component including an "A" pillar of a vehicle, and wherein the light source is attached to the "A" pillar.

16. The lighting apparatus defined in claim 15, wherein the light source includes first and second separate light sources.

17. The apparatus defined in claim 11, including a window and a lens attached to the window through which the light passes and by which the light is focused in a particular direction.

18. The apparatus defined in claim 11, including a vehicle interior component and wherein the light source is attached to the vehicle interior component.

19. The apparatus defined in claim 18, wherein the vehicle interior component comprises one of a vehicle "A" pillar, a vehicle "B" pillar, a vehicle "C" pillar, and a vehicle roof component.

20. The apparatus defined in claim 19, wherein the vehicle interior component comprises one of the vehicle "A" pillar and the vehicle "B" pillar.

21. The apparatus defined in claim 11, including a vehicle component with a surface adapted to form part of a passenger compartment on a vehicle, the light source being attached to the surface.

22. The apparatus defined in claim 14, wherein the light source is oriented to direct the light through the side window.

23. The apparatus defined in claim 22, including a lens attached to the side window for focusing the light passing therethrough.

24. The apparatus defined in claim 14, wherein the light source is attached to one of the "A" pillar and the "B" pillar.

25. The apparatus defined in claim 24, wherein the light source is attached to the "A" pillar.

26. The apparatus defined in claim 14, wherein the one of the "A" pillar, "B" pillar, and the roof component includes a surface adapted to form a part of a passenger compartment on a vehicle, the light source being attached to the surface.

27. The apparatus defined in claim 15, including a window, with the light source being oriented to direct focused light through the window.

28. The apparatus defined in claim 27, including a lens attached to the window and constructed to focus the light.

29. The apparatus defined in claim 15, wherein the component includes a surface defining the inside of the vehicle, the light source being attached to the surface.

* * * * *

UNITED STATES PATENT AND TRADEMARK OFFICE
CERTIFICATE OF CORRECTION

PATENT NO.   : 6,616,312 B2
DATED        : September 9, 2003
INVENTOR(S)  : John W. Carter It is certified that error appears in the above-identified patent and that said Letters Patent is hereby corrected as shown below:

Column 2,
Line 31, before "having", insert -- not --;

Column 5,
Line 17, "25C" (second occurrence) should be -- 25C' --;

Column 7,
Line 2, "a "A" pillar" should be -- an "A" pillar --.

Signed and Sealed this

Twenty-ninth Day of June, 2004

JON W. DUDAS
*Acting Director of the United States Patent and Trademark Office*